US007352855B2

(12) United States Patent
Bedingfield, Sr.

(10) Patent No.: US 7,352,855 B2
(45) Date of Patent: Apr. 1, 2008

(54) METHOD AND SYSTEM FOR PROVIDING A PRIVACY MANAGEMENT SERVICE

(75) Inventor: James C. Bedingfield, Sr., Lilburn, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 473 days.

(21) Appl. No.: 10/646,496

(22) Filed: Aug. 22, 2003

(65) Prior Publication Data

US 2005/0041792 A1    Feb. 24, 2005

(51) Int. Cl.
*H04M 3/42* (2006.01)

(52) U.S. Cl. .......................... 379/210.03; 379/201.11; 379/207.15; 379/142.05; 379/142.06; 455/415

(58) Field of Classification Search ........... 379/142.02, 379/210.03, 201.11, 207.15, 210.02, 142.05, 379/142.06
See application file for complete search history.

(56) References Cited

U.S. PATENT DOCUMENTS

| | | | | |
|---|---|---|---|---|
| 5,651,053 A | * | 7/1997 | Mitchell | 379/210.02 |
| 5,781,613 A | * | 7/1998 | Knuth et al. | 379/88.21 |
| 5,835,570 A | * | 11/1998 | Wattenbarger | 379/88.03 |
| 6,067,355 A | * | 5/2000 | Lim et al. | 379/142.14 |
| 6,160,877 A | * | 12/2000 | Tatchell et al. | 379/197 |
| 6,363,411 B1 | * | 3/2002 | Dugan et al. | 709/202 |
| 6,418,211 B1 | * | 7/2002 | Irvin | 379/188 |
| 6,496,569 B2 | * | 12/2002 | Pelletier et al. | 379/88.21 |
| 6,542,596 B1 | | 4/2003 | Hill et al. | 379/207.02 |
| 6,549,619 B1 | * | 4/2003 | Bell et al. | 379/210.02 |
| 6,553,110 B1 | * | 4/2003 | Peng | 379/210.03 |
| 6,631,182 B1 | * | 10/2003 | Schwab et al. | 379/88.19 |
| 6,658,455 B1 | * | 12/2003 | Weinman, Jr. | 709/203 |
| 6,944,184 B1 | * | 9/2005 | Miller et al. | 370/467 |
| 2002/0159574 A1 | * | 10/2002 | Stogel | 379/93.01 |
| 2004/0096046 A1 | * | 5/2004 | Lection et al. | 379/142.06 |
| 2004/0120504 A1 | * | 6/2004 | Bushnell | 379/355.04 |

\* cited by examiner

*Primary Examiner*—Fan Tsang
*Assistant Examiner*—Hemant Patel
(74) *Attorney, Agent, or Firm*—Cantor Colburn LLP

(57) ABSTRACT

A method for providing a privacy management service in a telephone system including initiating a telephone call from a subscriber telephone number to a called party telephone number. The initiating is performed by a subscriber. It is determined if the called party telephone number is located in a subscriber database corresponding to the subscriber. The called party telephone number is added to the subscriber database in response to the determining resulting in not locating the called party telephone number in the subscriber database. The telephone call between the subscriber telephone and the called party telephone number is connected.

18 Claims, 4 Drawing Sheets

METHOD AND SYSTEM FOR PROVIDING A PRIVACY MANAGEMENT SERVICE

FIELD OF THE INVENTION

The present invention relates generally to a method for providing a privacy management service and in particular, to a method of screening telephone calls from callers located at unknown, private and known telephone numbers.

BACKGROUND OF THE INVENTION

A privacy screening service is a service that allows a subscriber to the privacy screening service to screen incoming calls. The privacy screening service provides information to the called party (in this case, the subscriber to the privacy screening service) that allows the subscriber to make an informed decision about whether or not to answer the call. For example, a subscriber may use a privacy screening service to block all unidentified calls from going through. Private telephone numbers are telephone numbers that block services, such as "caller ID" that would otherwise identify the caller to the called party. In telephone systems that offer private telephone numbers and a privacy screening service to its customers, calls from a private telephone number to a subscriber with the privacy screening service cannot be completed automatically, unless the caller authorizes the system to override the privacy of the caller's telephone number. The subscriber's telephone doesn't ring unless the caller provides further identifying information (e.g., telephone number, name).

More and more companies are using the telephone as a marketing tool. As a result, many of the calls received at residences and businesses are telemarketing calls. Privacy screening services on the market, such as the BellSouth Privacy Director service, provide screening when the calling party telephone number is unknown or private. However, many telemarketers are now calling from known telephone numbers, allowing them to bypass the screening services. This situation will continue to compound when a recent Federal Trade Commission (FTC) recommendation that requires telemarketers to provide a valid, or known, calling telephone number becomes effective. Some telephone subscribers do not want these sorts of calls, or simply desire additional control over incoming calls. Features currently available in privacy screening services such as selective call acceptance and selective call rejection may also provide assistance in avoiding and/or screening telephone calls from known numbers, but they are currently limited to a maximum of about five telephone numbers per subscriber.

SUMMARY OF THE INVENTION

Embodiments of the present invention include a method for providing a privacy management service in a telephone system that includes initiating a telephone call from a subscriber telephone number to a called party telephone number. The initiating is performed by a subscriber. It is determined whether the called party telephone number is located in a subscriber database corresponding to the subscriber. The called party telephone number is added to the subscriber database in response to the determining resulting in not locating the called party telephone number in the subscriber database. The telephone call between the subscriber telephone and the called party telephone number is connected.

Other embodiments of the present invention include a system for providing privacy management in a telephone system having a service switching point in communication with a subscriber telephone having a subscriber telephone number, and a service control point in communication with the service switching point. The system includes an off-hook delay trigger provisioned on the subscriber line at the service switching point for triggering a query to the service control point whenever a telephone call is made from the subscriber telephone number to a called party number. The system further includes a subscriber database in communication with the service control point. In addition, the system includes a service package application on the service control point for responding to the query by determining whether the called party number is located in the subscriber database. When the called party number is not located in the subscriber database, the service package application adds the called party number to the subscriber database and routes the telephone call to the called party number. When the called party number is located in the subscriber database, the service package application routes the call to the called party number.

Other embodiments of the present invention include a computer program product for providing a privacy management service in a telephone system. The computer program product includes a storage medium readable by a processing circuit and storing instructions for execution by the processing circuit for performing a method. The method includes initiating a telephone call from a subscriber telephone number to a called party telephone number. The initiating is performed by a subscriber. It is determined if the called party telephone number is located in a subscriber database corresponding to the subscriber. The called party telephone number is added to the subscriber database in response to the determining resulting in not locating the called party telephone number in the subscriber database. The telephone call between the subscriber telephone and the called party telephone number is connected.

Other systems, methods and/or computer program products according to embodiments will be or become apparent to one with skill in the art upon review of the following drawings and detailed description. It is intended that all such additional systems, methods, and/or computer program products be within the scope of the present invention, and be protected by the accompanying claims.

BRIEF DESCRIPTION OF THE DRAWINGS

Referring to the exemplary drawings wherein like elements are numbered alike in the several FIGURES.

DETAILED DESCRIPTION OF THE INVENTION

Exemplary embodiments of the present invention provide subscriber control over incoming telephone calls by providing a personal subscriber database of telephone numbers associated with each subscriber. Callers placing calls from telephone numbers that are not located on the subscriber database will be greeted with a screening announcement requesting identification data such as the caller name and the purpose of the call. The subscriber telephone doesn't ring until the caller has provided this information and then, when the subscriber telephone does ring, the subscriber is presented with the information about the caller. The subscriber may then decide how to handle the call (e.g., voice mail, answer, play a "don't call back" message). Telephone numbers are added to the subscriber database in a variety of manners. One method for adding telephone numbers to the subscriber database is to add every telephone number called by the subscriber. In addition, the subscriber may add the telephone numbers of particular callers to the subscriber database (e.g., in response to receiving a call from the caller, by entering a list of telephone numbers via an Internet application). Exemplary embodiments of the present invention allow a subscriber to screen calls from telemarketers at known telephone numbers by only allowing telephone calls from telephone numbers located in the subscriber database to be directly connected (i.e., no screening) to the subscriber.

Figure 1:
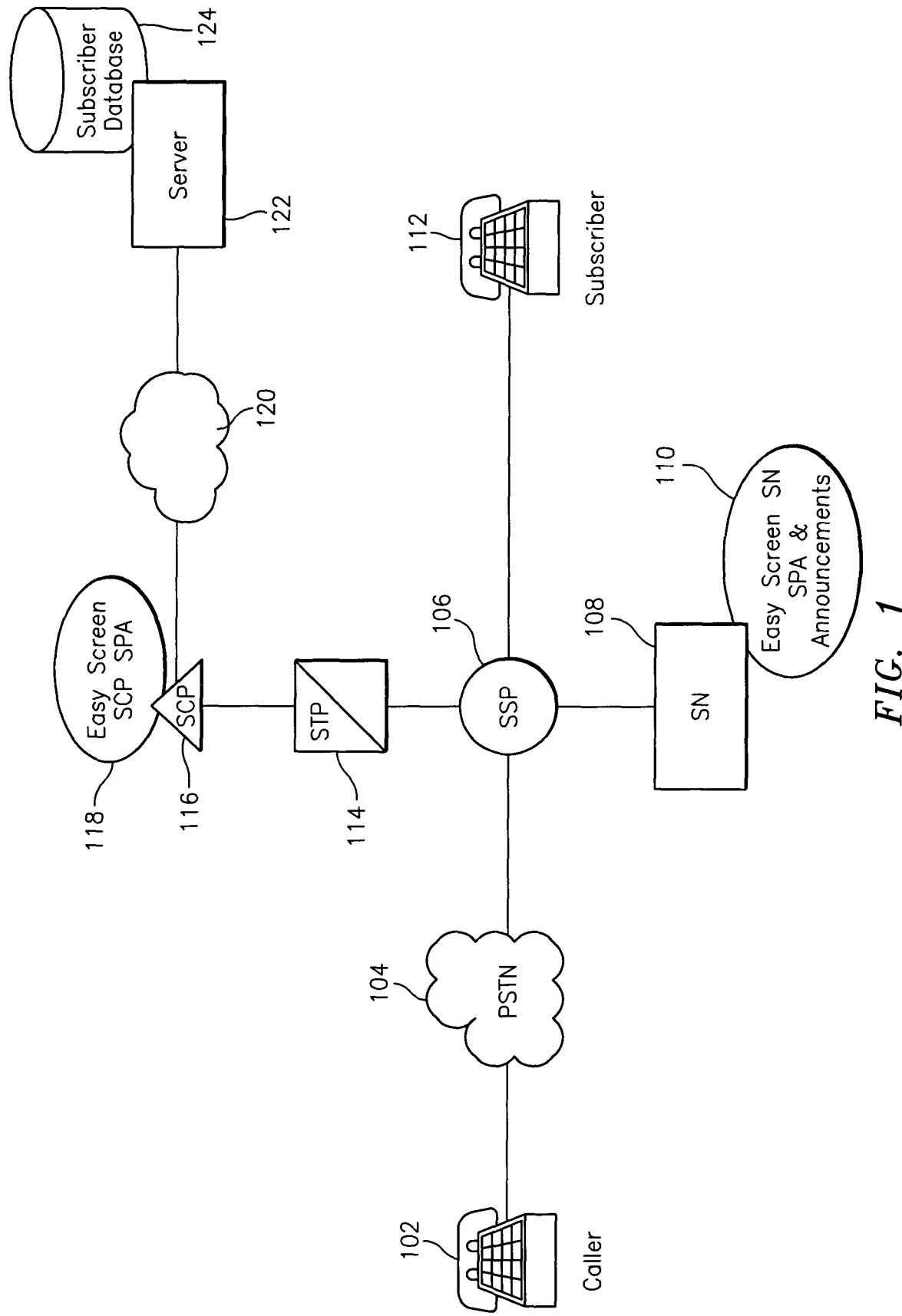
FIG. 1 is a block diagram of a system for providing a privacy management service in accordance with exemplary embodiments of the present invention.

FIG. 1 is a block diagram of a system for providing privacy screening in accordance with exemplary embodiments of the present invention. FIG. 1 includes a caller telephone 102 connected to a public switched telephone network (PSTN) 104 via the caller's voice lines. In alternate embodiments of the present invention, the PSTN 104 may be replaced by any network known in the art for handling voice traffic, such as the Internet or a voice over Internet protocol (VOIP) network. As depicted in FIG. 1, the PSTN 104 is in communication, via voice lines and/or voice trunks, with a service switching point (SSP) 106. The SSP 106 shown in FIG. 1 services the subscriber telephone 112, which is in communication, via voice lines and/or voice trunks, with the SSP 106. The subscriber is a customer who has signed up for a simplified screening service (hereafter referred to as "the easy screen service".) The caller telephone 102 and the subscriber telephone 112 may be implemented using conventional landline telephones or wireless mobile telephones. In addition, the caller telephone 102 and the subscriber telephone 112 may be located in a variety of geographic locations (e.g., home, car, office).

When a caller located on the caller telephone 102 dials the subscriber telephone 112, the telephone call is transferred to the SSP 106. In exemplary embodiments of the present invention, the SSP 106 includes two triggers. The first is an off-hook delay trigger to send information about the telephone call to the service control point (SCP) 116 via the signaling transfer point (STP) 114. This trigger is initiated when a subscriber makes an outgoing telephone call. The off-hook delay trigger initiates a inquiry transaction to the SCP 116 to find out if the telephone number of the party being called by the subscriber is located in the subscriber database. If the telephone number of the party being called by the subscriber is not located in the subscriber database then subscriber database is updated with the telephone number. A second trigger located on the SSP 106 is a termination attempt trigger (TAT) that is initiated when an incoming telephone call is received at the SSP 106 for a subscriber. The TAT initiates a query to the SCP 116 to find out if the telephone number of the incoming telephone caller is located on the subscriber database. Based on the results of the query, particular screening processes are performed.

The STP 114 controls the communication between the SCP 116 and the SSP 106. The STP 114 is a signaling hub that routes packets of data. The STP routes information about a telephone call from the SSP 106 to the SCP 116 and back from the SCP 116 to the SSP 106. A network, such as a Signaling System 7 (SS7) network carries data and control messages between the SSP 106 and the SCP 116 via the STP 114. In exemplary embodiments of the present invention, the SCP 116 is implemented using a high power fault tolerant computer (e.g., AT&T Star Server FT Model 3300, Lucent Advantage 4P200). The SCP 116 has access to the easy screen SCP service package application (SPA) 118, as well as the server 122 and the subscriber database 124 located on a storage device. SCP access to the easy screen SCP SPA 118 and the subscriber database is via the network 120.

The information about the telephone call sent to the SCP 116 includes data such as the subscriber's telephone number and the calling party's telephone number, if known. The easy screen SCP SPA 118 queries records in the subscriber database associated with the subscriber's telephone number to determine if the calling party's telephone number is located in the subscriber database. If the calling party's telephone number is located, the message is relayed back to the SSP 106. The SSP 106 then connects the telephone call to the subscriber telephone 112 without any further screening. If the call is from a caller with an unknown telephone number, a private telephone number, or a known telephone number not located in the subscriber database, further screening is performed to determine if the telephone call should be put through to the subscriber. The screening process is described in reference to FIGS. 3-4.

In exemplary embodiments of the present invention, the easy screen SCP SPA 118 located on the SCP 116 accesses a server 122 via a network 120 to access data contained in the subscriber database. The network 120 may be any type of known network such as a local area network (LAN), a wide area network (WAN), or a global network (e.g., Internet). In exemplary embodiments of the present invention, the network is implemented using transmission control protocol/internet protocol (TCP/IP). The easy screen SCP SPA 118 may access the server system 122 through multiple networks (e.g., intranet and Internet) so that it is not necessary for all easy screen SCP SPA implementations to be coupled to the server 122 through the same network. The easy screen SCP SPA 118 and the server 122 may be connected to the network 120 in a wireless fashion and the network 120 may be a wireless network. In exemplary embodiments of the present invention, the easy screen SCP SPA 118 executes a user interface application (e.g., web browser) to contact the server 122 through the network 120.

In exemplary embodiments of the present invention, the server 122 provides access to the subscriber database 124 that is located on the storage device. The storage device may be implemented using a variety of devices for storing electronic information such as a file transfer protocol (FTP) server. It is understood that the storage device may be implemented using memory contained in the server 122 or in the SCP 116 hardware or it may be a separate physical device. The storage device includes one or more subscriber databases 124. Each subscriber is assigned a subscriber database. The physical implementation of the subscriber database may include subscriber databases for a plurality of subscribers being located in the same physical database. The server 122 may operate as a database server and coordinate access to application data including data in the subscriber database 124 stored on the storage device.

The system depicted in FIG. 1 also includes a service node (SN) 108. The SN 108 includes an easy screen SN SPA 110 and easy screen announcements 126. If the SCP 116 determines that the caller's telephone number is not located on the subscriber database, it sends a command to the SSP 106 to transfer the telephone call to the SN 108 for further screening. In exemplary embodiments of the present invention, the SN 108 is in communication with the SSP 106 via an integrated services digital network (ISDN) connection. The SN 108 may answer the incoming telephone call and ask the caller for further information (e.g., caller name). In addition, the SN 108 may call the subscriber to get further instructions on how to proceed with the incoming telephone call. The easy screen SN SPA 110 may perform the further screening and communicate with the subscriber telephone 112 and the caller telephone 102. The screening process is described in reference to FIGS. 3-4.

The system depicted in FIG. 1 may be implemented by portions of an existing privacy manager such as the Bell-South Privacy Director. Computer code to perform the logic associated with the easy screen SCP SPA 118 is attached to the existing code via a SPA interface. In addition, the connection to the network 120 and the application code on the server 122 as well as the data format in the subscriber database 124 implements exemplary embodiments of the present invention. Various alternate system embodiments are available including locating the easy screen SCP SPA 118 on the server 122 and locating the subscriber database 124 on the SCP 116. The placement of the various components of the system depicted in FIG. 1 may vary based on user and system requirements.

Figure 2:
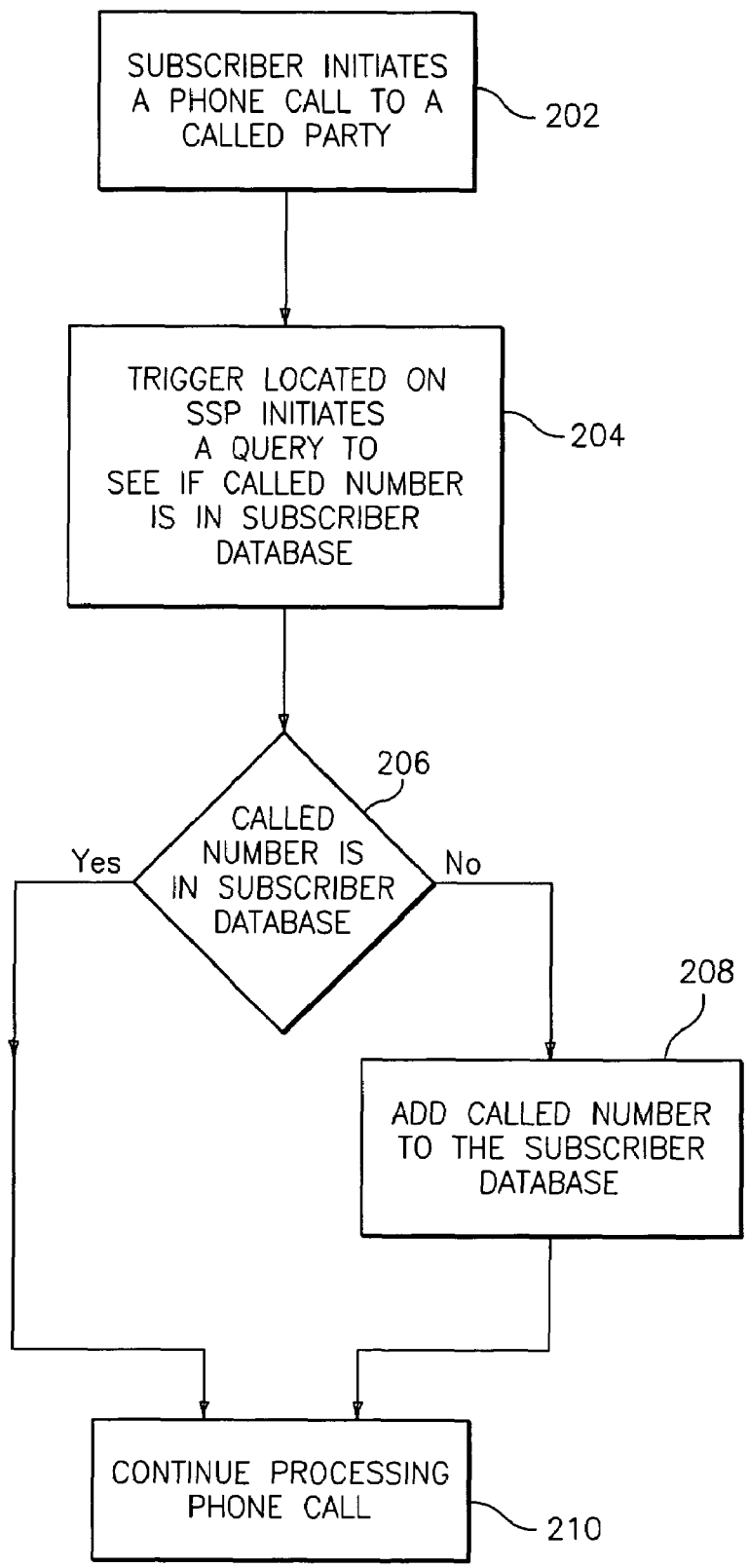
FIG. 2 is a flow diagram of a process for adding telephone numbers to a subscriber database in accordance with exemplary embodiments of the present invention.

FIG. 2 is a flow diagram of a process for adding telephone numbers to a subscriber database in accordance with exemplary embodiments of the present invention. At step 202, a subscriber initiates a telephone call to a called party. At step 204, an off-hook delay trigger located on the SSP 106 initiates the execution of a query to be sent to the SCP 116 via the STP 114. The inquiry transaction includes the subscriber telephone number and the telephone number of the called party. At step 206, the easy screen SCP SPA 118 executes a query against the subscriber database to see if the telephone number of the called party is located in the subscriber database. If the telephone number of the called party is not in the subscriber database, as determined at step 206, then step 208 is performed to add the telephone number of the called party to the subscriber database. Processing of the telephone call then continues at step 210. If the telephone number of the called party is located in the subscriber database, as determined at step 206, then step 208 is skipped and processing continues at step 210.

The subscriber database may also be updated directly via a network, or web, interface. A user system may be connected to the network 120 with access to the subscriber database. Alternatively, the user system may be directly connected to the server 122. In this manner the subscriber database associated with a particular subscriber may be populated quickly or copied from other data files. For example, telephone numbers located on a subscriber's palm pilot may be uploaded into the subscriber database. In addition, the subscriber database may be updated manually by the subscriber via an administrative interface accessible from the subscriber telephone 112. Further, the subscriber database may be updated with a new caller telephone number by the subscriber when a telephone call is received from the caller. Telephone numbers may be deleted from the subscriber database via the administrative interface or the network interface.

Figure 3:
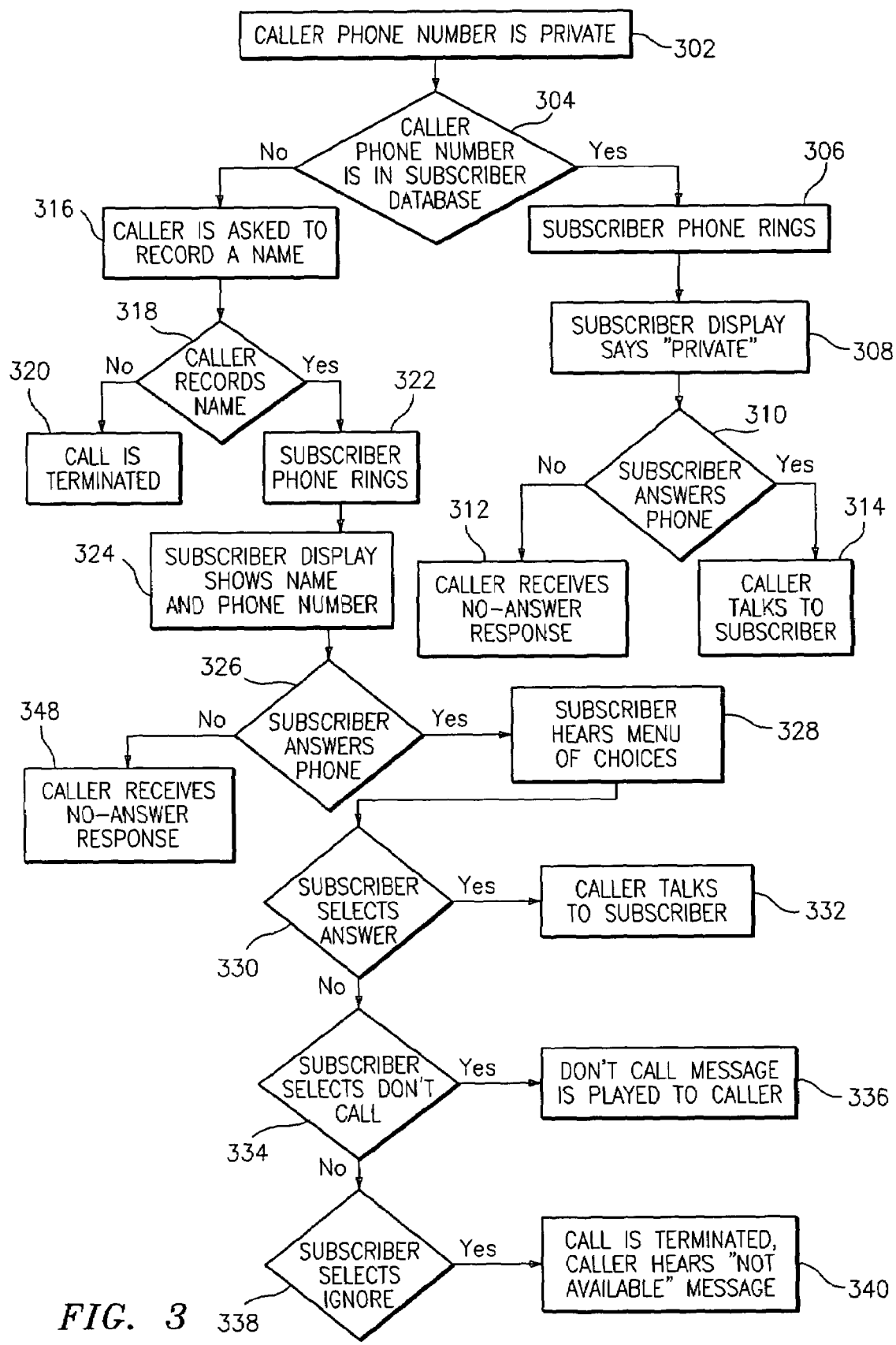
FIG. 3 is a flow diagram of a process for handling an incoming telephone call from a private telephone number in accordance with exemplary embodiments of the present invention.

FIG. 3 is a flow diagram for handling an incoming telephone call from a private telephone number in accordance with exemplary embodiments of the present invention. At step 302, a telephone call from a private number is received by a subscriber to the easy screen service. At step 304 a check is made to determine is the caller's telephone number is located in the subscriber database. If the telephone number is located in the subscriber database, then step 306 is performed and the subscriber telephone 112 rings. At step 308, the subscriber display on the subscriber telephone 112 says "private." If the subscriber answers the telephone, as determined at step 314, then the caller talks to the subscriber. Otherwise, if the subscriber does not answer the telephone, the caller receives a standard no-answer response (e.g., voice mail, answering machine) at step 312.

If the caller's telephone number is not located in the subscriber database, as determined at step 304, then step 316 is performed. At step 316, the telephone call has been sent to the SN 108 and the easy screen SN SPA 110 asks the caller to provide a name and/or telephone number. If the caller does not record a name and/or telephone number, as determined at step 318, then step 320 is performed and the call is terminated. If the caller does record a name and/or telephone number, then step 322 is performed and the subscriber's telephone rings at step 322. At step 324, the display on the subscriber telephone 112 shows the name and/or telephone number of the caller. If the subscriber does not answer the telephone, as determined at step 326, then step 348 is performed and the caller receives a standard no-answer response.

If the subscriber does answer the telephone, as determined at step 326, the step 328 is performed and the subscriber hears or sees a menu of options. At step 330, a check is made to see if the subscriber has selected the answer option. If the subscriber has selected the menu option, then the caller talks to the subscriber at step 332. Alternatively, a check is made at step 334 to see if the subscriber has selected the "don't call" option. If the subscriber has selected the "don't call" option then step 336 is performed and a "don't call" message is played to the caller. Alternatively, at step 338, a check is made to determine if the subscriber has selected the ignore option. If the ignore option was selected by the subscriber, then step 340 is performed. At step 340, the caller hears a "not available" message and the call is terminated.

Figure 4:
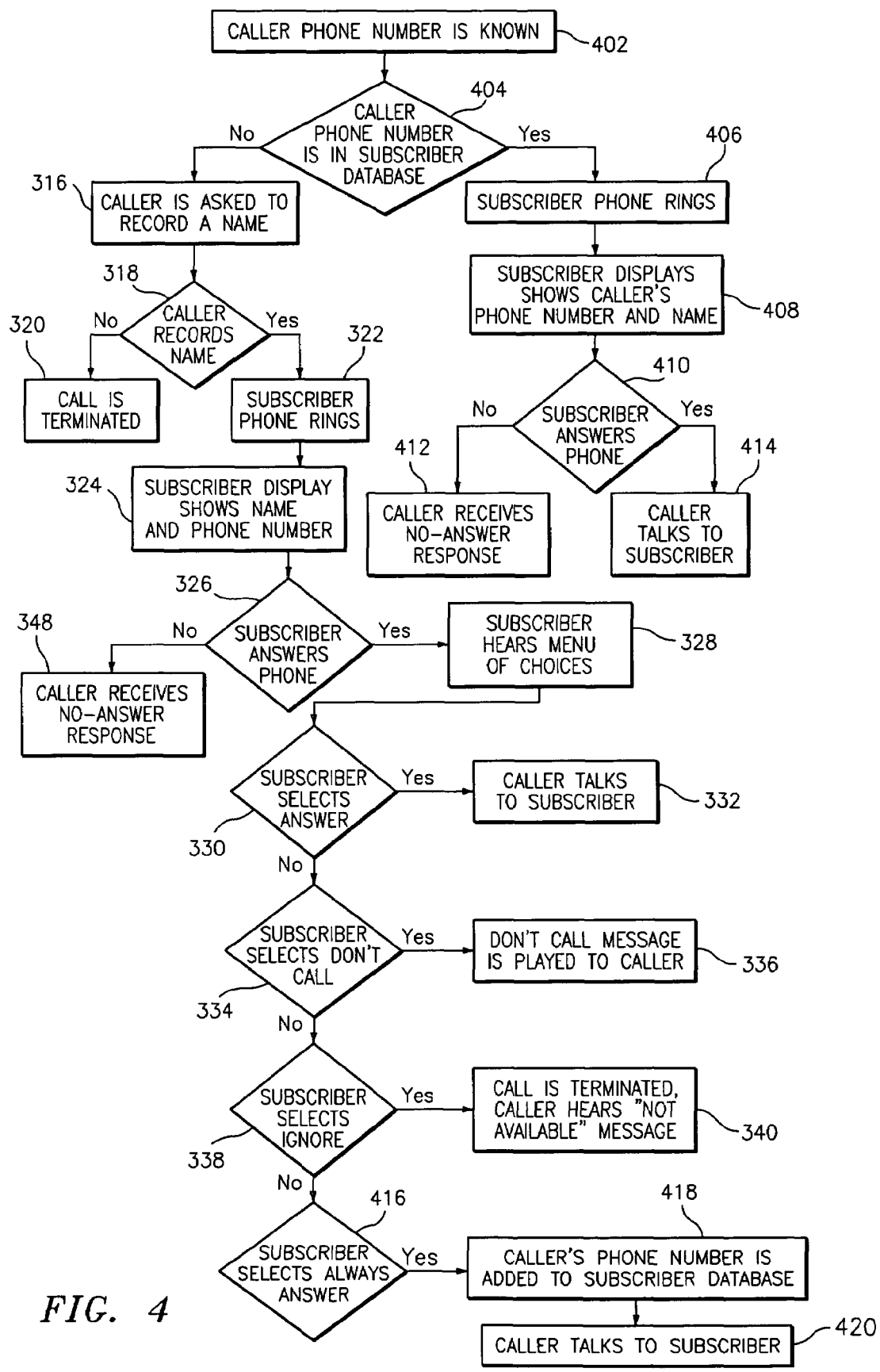
FIG. 4 is a flow diagram of a process for handling an incoming telephone call from a known telephone number in accordance with exemplary embodiments of the present invention.

FIG. 4 is a flow diagram of a process for handling an incoming telephone call from a known telephone number in accordance with exemplary embodiments of the present invention. At step 402 a telephone call from a caller located at a known telephone number is received. At step 404, a check is made to determine if the caller telephone number is located in the subscriber database. If the caller telephone number is located in the subscriber database, then step 406 is performed and the subscriber telephone 112 rings. At step 408, the display on the subscriber telephone 112 shows the caller's telephone number and name. At step 410, a check is made to determine if the subscriber answered the telephone. If the subscriber answered the telephone then step 414 is performed and the caller talks to the subscriber. Otherwise, step 412 is performed and the caller receives a standard no-answer response (e.g., voice mail, answering machine). If, at step 404, it is determined that the caller telephone number is not located in the subscriber database then the processing in FIG. 3 starting at step 316 (through step 340) is performed. If at step 338 it is determined that the subscriber has not selected the ignore option then step 416 is performed. At step 416, a check is made to determine if the subscriber selected the "always answer" option. If the "always answer" option has been selected, then step 418 is performed and the caller's telephone number is added to the subscriber database. The caller's telephone number is added by sending a request to the SCP 116 via the SSP 106 to add the telephone number to the subscriber database. Next, at step 420, the subscriber talks to the caller. If a telephone call is received from a caller at an unknown telephone number then processing begins at step 316 in FIG. 3.

Embodiments of the present invention allow a subscriber to screen incoming telephone calls from known, unknown and private telephone numbers by screening all telephone calls from telephone numbers not located on the subscriber database. The subscriber database is specific to the subscriber and includes telephone numbers added to the subscriber database by the subscriber as well as the telephone numbers of parties the subscriber has called. The ability to screen telephone calls from known parties may allow a subscriber to avoid answering telemarketing telephone calls. In addition, allowing callers from telephone numbers not located on the subscriber database to identify themselves may result in the subscriber not missing important telephone calls from friends or family calling from different telephone numbers. The ability to automatically add the telephone numbers of parties the subscriber has called to the subscriber database may allow the easy screen service to take less set-up time and administrative time for the subscriber. Inputting the initial list of telephone numbers into the subscriber database via the Internet may also decrease the amount of set-up time. This may lead to increased subscriber satisfaction with the service.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for providing a privacy management service in a telephone system by using originating calls to build a database of acceptable incoming calls, said method comprising:

detecting a telephone call from a subscriber telephone number to a called party telephone number;

determining if said called party telephone number is located in a subscriber database of telephone numbers corresponding to said subscriber telephone number;

adding said called party telephone number to said subscriber database in response to said determining resulting in not locating said called party telephone number in said subscriber database; and connecting said telephone call between said subscriber telephone number and said called party telephone number, wherein incoming telephone calls to said subscriber telephone number from caller party telephone numbers located in the subscriber database are directly connected to the subscriber telephone number, the incoming telephone calls each displayed with caller data for a known phone number and a private indicator for a private phone number, and incoming calls to said subscriber telephone number from caller party telephone numbers not located in the subscriber database are transmitted to a screening application wherein the screening application comprises: transmitting a request for a caller at a caller party telephone number to provide identification data in response to receiving an incoming telephone call from the call at the subscriber telephone, and presenting screening options to a subscriber at the subscriber telephone number in response to receipt of the identification data, wherein presenting screening options to the subscriber include an always answer option performed in response to a selection by the subscriber, and wherein performing the always answer option includes: adding said caller telephone number to said subscriber database and connecting the incoming telephone call between said subscriber telephone number and said caller telephone number.

2. The method of claim 1 wherein said determining includes:

transmitting an inquiry transaction to said subscriber database, said inquiry transaction including said subscriber telephone number and said called party telephone number; and receiving a response to said inquiry transaction responsive to said inquiry.

3. The method of claim 2 wherein said transmitting an inquiry transaction is via a signaling transfer point to a service control point and said service control point is in communication with said subscriber database.

4. The method of claim 3 wherein said communication is via a network.

5. The method of claim 1 wherein said adding is performed via a signaling transfer point and a service control point in communication with said subscriber database.

6. A system for providing a privacy management service by using originating calls to build a database of acceptable incoming calls in a telephone system having a service switching point in communication with a subscriber telephone having a subscriber telephone number, and a service control point in communication with the service switching point, said system comprising:
- an off-hook delay trigger provisioned on the subscriber line at the service switching point for triggering a query to the service control point whenever a telephone call from the subscriber telephone number to a called party number is detected;
- a subscriber database of telephone numbers, which is in communication with the service control point; and
- a service package application on the service control point for responding to the query by determining whether the called party number is located in the subscriber database, wherein:
  - when the called party number is not located in the subscriber database, the service package application adds the called party number to the subscriber database and routes the telephone call to the called party number, wherein incoming telephone calls to said subscriber telephone number from caller party telephone numbers located in the subscriber database are directly connected to the subscriber telephone number and incoming calls to said subscriber telephone number from caller party telephone numbers not located in the subscriber database are transmitted to a screening application; and
  - when the called party number is located in the subscriber database, the service package application routes the call to the called party number, causing the subscriber telephone to display caller data for a known phone number and a private indicator for a private phone number,
- wherein the screening application comprises: transmitting a request for a caller at a caller party telephone number to provide identification data in response to receiving an incoming telephone call from the call at the subscriber telephone number, and presenting screening options to a subscriber at the subscriber telephone number in response to receipt of the identification data,
- wherein presenting screening options to the subscriber include an always answer option performer in response to a selection by the subscriber, and
- wherein performing the always answer option includes: adding said caller telephone number to said subscriber database and connecting the incoming telephone call between said subscriber telephone number and said caller telephone number.

7. The system of claim 6 wherein said subscriber database is in communication with the service control point via a network.

8. The system of claim 7 wherein the network is the Internet.

9. The system of claim 7 wherein the network is TCP/IP.

10. The system of claim 6 wherein said subscriber database is in direct communication with said service control point.

11. The system of claim 6 further comprising a storage device, wherein said subscriber database is located on said storage device.

12. The system of claim 6 wherein said subscriber database is a relational database.

13. The system of claim 6 wherein said subscriber database is in communication with the service control point via a server in communication with a network.

14. The system of claim 6 further comprising a user system in communication with said subscriber database for updating said subscriber database.

15. The system of claim 13 wherein said user system is in communication with said subscriber database via a network.

16. A computer program product for providing a privacy management service in a telephone system by using originating calls to build a database of acceptable incoming calls, the computer program product comprising:
- a storage medium readable by a processing circuit and storing instructions for execution by the processing circuit for performing a method comprising:
  - detecting a telephone call from a subscriber telephone number to a called party telephone number;
  - determining if said called party telephone number is located in a subscriber database of telephone numbers corresponding to said subscriber telephone number;
  - adding said called party telephone number to said subscriber database in response to said determining resulting in not locating said called partytelephone number in said subscriber database; and
  - connecting said telephone call between said subscriber telephone number and said called party telephone number,
- wherein incoming telephone calls to said subscriber telephone number from caller party telephone numbers located in the subscriber database are directly connected to the subscriber telephone number, the incoming telephone calls each displayed with caller data for a known phone number and a private indicator for a private phone number, and incoming calls to said subscriber telephone number from caller party telephone numbers not located in the subscriber database are transmitted to a screening application
- wherein the screening application comprises: transmitting a request for a caller at a caller party telephone number to provide identification data in response to receiving an incoming telephone call form the call at the subscriber telephone number, and presenting screening options to a subscriber at the subscriber telephone number in response to receipt of the identification data,
- wherein presenting screening options to the subscriber include an always answer option performed in response to a selection by the subscriber, and
- wherein performing the always answer option includes; adding said caller telephone number to said subscriber database and connecting the incoming telephone call between said subscriber telephone number and said caller telephone number.

17. The method of claim 1 wherein caller data for a known phone number includes a caller name and a phone number.

18. The system of claim 6 wherein caller data for a known phone number includes a caller name and a phone number.

* * * * *